United States Patent [19]

Fukami et al.

[11] Patent Number: 4,809,173
[45] Date of Patent: Feb. 28, 1989

[54] ELECTRICALLY DRIVEN POWER STEERING APPARATUS

[75] Inventors: Masanobu Fukami, Aichi; Naoji Sakakibara, Chiryu, both of Japan

[73] Assignee: Aisin Seiki Kabushikikaisha, Aichi, Japan

[21] Appl. No.: 55,390

[22] Filed: May 29, 1987

[30] Foreign Application Priority Data

May 31, 1986 [JP] Japan .................................. 61-126687

[51] Int. Cl.$^4$ .............................................. B62D 5/04
[52] U.S. Cl. ................................ 364/424.05; 180/79.1
[58] Field of Search ............. 364/424, 550; 340/52 R, 340/52 F, 662, 663; 180/79.1, 141, 142; 74/388 PS

[56] References Cited

U.S. PATENT DOCUMENTS

| 4,567,413 | 1/1986 | Yabe et al. | 180/79.1 |
| 4,624,334 | 11/1986 | Kelledes et al. | 180/79.1 |
| 4,624,335 | 11/1986 | Shiraishi et al. | 180/79.1 |

Primary Examiner—Gary Chin
Attorney, Agent, or Firm—Sughrue, Mion, Zinn, Macpeak, and Seas

[57] ABSTRACT

An electrically driven power steering apparatus develops an assisting steering force to be applied to a steering system in accordance with a driving force detected, by detecting a driving force which is applied to a steering system from steering means and allowing an electric motor of an electric drive mechanism to be energized at a higher power level when the driving force detected is of an increased magnitude and at a reduced power level when the detected driving force is of a reduced magnitude. A voltage output from an onboard power supply is monitored, and when the voltage is below a given value, the motor is energized at a power level which is less than the energization power level which corresponds to the detected driving force. In this manner, a degradation of the onboard battery is prevented which would result from the operation of the electrically driven power steering apparatus when the battery voltage is low or when the charging power is insufficient. The energizing power level applied to the motor is limited by two alternative methods. In one method, the energization of the motor above an upper limit of energization power level is inhibited. In a second method, a lower limit is established for a response driving force, and the energization of the motor is inhibited in response to a driving force which is below the lower limit.

5 Claims, 11 Drawing Sheets

ELECTRICALLY DRIVEN POWER STEERING APPARATUS

BACKGROUND OF THE INVENTION

The invention relates to a power steering apparatus which may be utilized to reduce the magnitude of a force which must be applied to steering means such as a steering wheel in order to steer a vehicle, and in particular, to an electrically driven power steering apparatus including an electric drive mechanism having an electric motor and which detects the magnitude of a torque that is applied from steering means to a direction controlling mechanism, which establishes a particular direction in which the vehicle is to run, and which applies a driving force of a magnitude corresponding to the magnitude of the torque to the direction controlling mechanism from the electric drive mechanism.

When it is desired to redirect wheels, a force of an increased magnitude is required to turn a steering wheel when the vehicle is at rest or is running at a low speed. In particular, with FF cars which are increasing in number recently and which have their front wheels designed as driving wheels, a further increase in the steering force is required.

To accommodate for this, a power steering apparatus which assists a driver in a steering operation has been proposed. Such apparatus produces a drive force in accordance with a steering force of a driver, and transmits it to a direction controlling mechanism (hereafter referred to as a steering system) which establishes a particular direction in which the vehicle is to run. Almost all of power steering apparatus which is currently in practical use is of hydraulic type. Thus, such apparatus is provided with a control valve, hydraulic cylinder and the like, and operates to produce an assisting steering force through a movement of a pressure oil in accordance with the steering force. However, it will be noted that such control valve, hydraulic cylinder and the like are bulky in size, and must be connected together through pipings which can only be bent with radii of curvature greater than a given value in order to avoid pressure losses. A hydraulic power steering apparatus must be provided with a reliable oil seal against leakage, which requires a troublesome mounting operation. Thus, a mounting of the hydraulic power steering apparatus presents a problem in a vehicle such as FF car where available remaining space is small.

To overcome the described problem, there has been proposed an electrically driven power steering apparatus which utilizes an electric motor as a drive source and which detects the magnitude of a torque applied to a steering system from steering means so that the motor applies an assisting steering force to the steering system in a manner corresponding to the magnitude of torque detected. With this arrangement, the space utility is improved, and in addition, a varying magnitude of assisting steering force which cannot be obtained with a conventional hydraulic power steering apparatus, for example, an assisting steering force which is dependent on a vehicle speed, may be developed when used in combination with an electronic controller.

In an electrically driven power steering apparatus of the kind described, an electric motor is utilized as a drive source, and accordingly, the power dissipation of the motor presents a problem. It is one of the features of the electrically driven power steering apparatus that an assisting steering force is available without requiring the operation of an engine to maintain the power steering apparatus operative upon shortage of a fuel or during the time a vehicle is being tracted. However, under such condition, an onboard battery is not charged, and accordingly the use of power by the power steering apparatus induces a premature degradation or a reduced voltage output from the onboard battery. It will be understood that a vehicle is equipped with a variety of electrical components in addition to the steering apparatus, including headlights, taillights and a car audio unit. Obviously, the power dissipation by the motor of the electrically driven power steering apparatus represents a major factor among these components. Accordingly, when a plurality of components are being operated and in addition the steering apparatus is operated, the total power dissipation may exceed the charging capability of the vehicle, resulting in a failure to properly charge the onboard battery even though the engine is in operation.

It will be understood that a degradation in the onboard battery leads to the inability to operate a starter, the inability to operate various electrical components or a misfire. Hence, it is necessary that a driver be fully careful about the total amount of the power dissipation onboard the vehicle whenever a voltage output from the onboard battery is reduced or when the engine is turned off. However, a driver will then be unduly stressed to determine a reduced voltage output from the onboard battery or a reduction in the charging capability. Accordingly, there has been no remedy to protect an onboard battery.

SUMMARY OF THE INVENTION

It is an object of the invention to prevent a degradation in an onboard battery which might occur as a result of energizing an electric motor of an electrically driven power steering apparatus.

The purpose of an electrically driven power steering apparatus is to assist in a steering operation by a driver. A manual steering operation is possible if the electric motor of an electric drive mechanism is not energized, and hence, it is not required that the steering apparatus be maintained functionable to a point where a safety device such as headlights or taillights can no longer be properly energized. In other words, in the event there is a likelyhood of causing such inability, the steering operation may be changed to a manual operation without causing any inconvenience.

Accordingly, the above object is accomplished in accordance with the invention by providing an electrically driven power steering apparatus comprising an electric drive mechanism which includes an electric motor which is energized at a power level which depends on a detected magnitude of a driving force which is applied from steering means to a steering system so as to apply an assisting drive force, which depends on the detected driving force, to the steering system. In accordance with the invention, a voltage output from an onboard power supply is detected, and if the detected voltage is less than a given value, the electric motor is energized at a power level which is less than that corresponding to the detected driving force. Thus, when the voltage output from the onboard power supply is reduced, the electric motor of the electric drive mechanism is energized at a correspondingly lower level, thus preventing the degradation in the onboard battery.

In a first embodiment of the invention, when a detected magnitude of a voltage output from an onboard power supply is equal to or less than a given level, a low maximum energization power level is preset so as to correspond to the detected magnitude of the voltage output. If a power level with which the motor is to be energized in response to a detected driving force which is applied to a steering system is found to be equal to or less than the preset maximum energization power level, the electric motor is allowed to be energized at a corresponding power level. However, if the power level at which the motor is to be energized in response to the detected driving force exceeds the preset maximum energization power level, the motor is energized at the preset maximum power level.

Specifically, FIG. 7 graphically shows the maximum energization power level with which the motor can be energized on the ordinate while the abscissa represents the voltage output from the onboard power supply. As shown, when the voltage output is high, the maximum energization power level can be chosen higher than that which is available when the voltage output from the power supply is reduced. FIG. 8 graphically shows a power level, on the ordinate, with which an electric motor is energized for rotation in either forward or reverse direction in a manner corresponding to a steering torque that is applied from a steering wheel to a steering shaft. The power level which is used for energizing the motor is clamped at a preset maxium energization power level. Specifically, if the voltage output from the power supply is reduced, the power level with which the motor will be energized becomes saturated at a smaller value of the input torque.

In a second embodiment of the invention, when a detected magnitude of a voltage output from an onboard power supply is equal to or less than a given level, a high minimum response drive force is preset so as to correspond to the detected magnitude of the voltage output. When a detected magnitude of a driving force which is applied to the steering system exceeds the preset minimum response drive force, the electric motor is energized at a level which corresponds to the detected magnitude of a driving force.

More specifically, FIG. 13 graphically shows a dead band as a function of the voltage output from the power supply. Thus, the dead band will be small for a high supply voltage and will be large for a reduced supply voltage. The dead band is utilized to clamp the input torque or a steering torque which is applied from a steering wheel to a steering shaft, and accordingly, the energization of the motor will be initiated for an increased magnitude of the input torque when the supply voltage is reduced. Since the magnitude of the input torque varies continuously, this arrangement is effective to limit the power level at which the motor is energized in a series of energization runs of the motor corresponding to the varying input torque. Stated differently, when the voltage output from the power supply is reduced, the motor is energized at a reduced power level if an increased magnitude of steering torque is detected, thus effectively limiting the power dissipation of the motor.

Above and other objects and features of the invention will become apparent from the following description of several embodiments thereof with reference to the drawings.

BRIEF DESCRIPTION OF THE DRAWINGS

FIG. 10 shows one exemplary waveform illustrating an input/output operation of B11 block shown in FIG. 6a;

DETAILED DESCRIPTION OF EMBODIMENT

Figure 1:
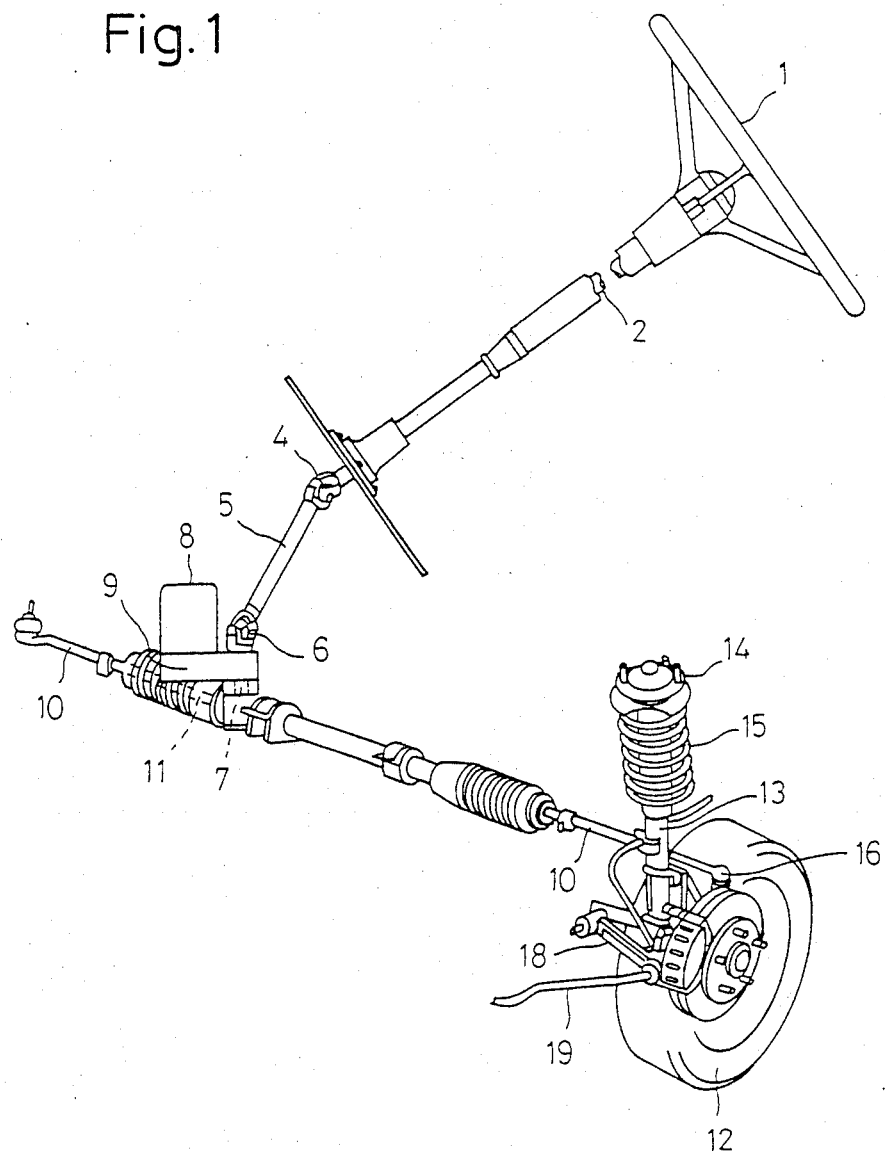
FIG. 1 is a perspective view of the mechanical construction of a power steering apparatus which may be utilized in a first and a second embodiment of the invention.

FIG. 1 shows a general arrangement of a mechanism used in one embodiment of the invention. A steering wheel 1 is fixedly connected with a first steering shaft 2, which is coupled to a second steering shaft 5 by means of a first universal joint 4. A second universal joint 6 couples the second steering shaft 5 to a rod 7, which is in turn coupled to an output shaft (21, to be described later) of a reduction gearing 9 on which a pinion gear (22, to be described later) is formed. The pinion gear (22) meshes with a rack 11 which is fixedly mounted on a tie rod 10. The tie rod 10 is coupled to a steering knuckle arm 16 of a wheel 12. The wheel 12 has an axle which is fastened to a shock absorber 13 having a suspension upper support 14 which is coupled to a car body, not shown. A coiled spring 15 is connected between the upper support 14 and the axle to serve as a vibration buffer. A lower suspension arm is shown at 18 and a stabilizer bar is shown at 19.

Figure 2:
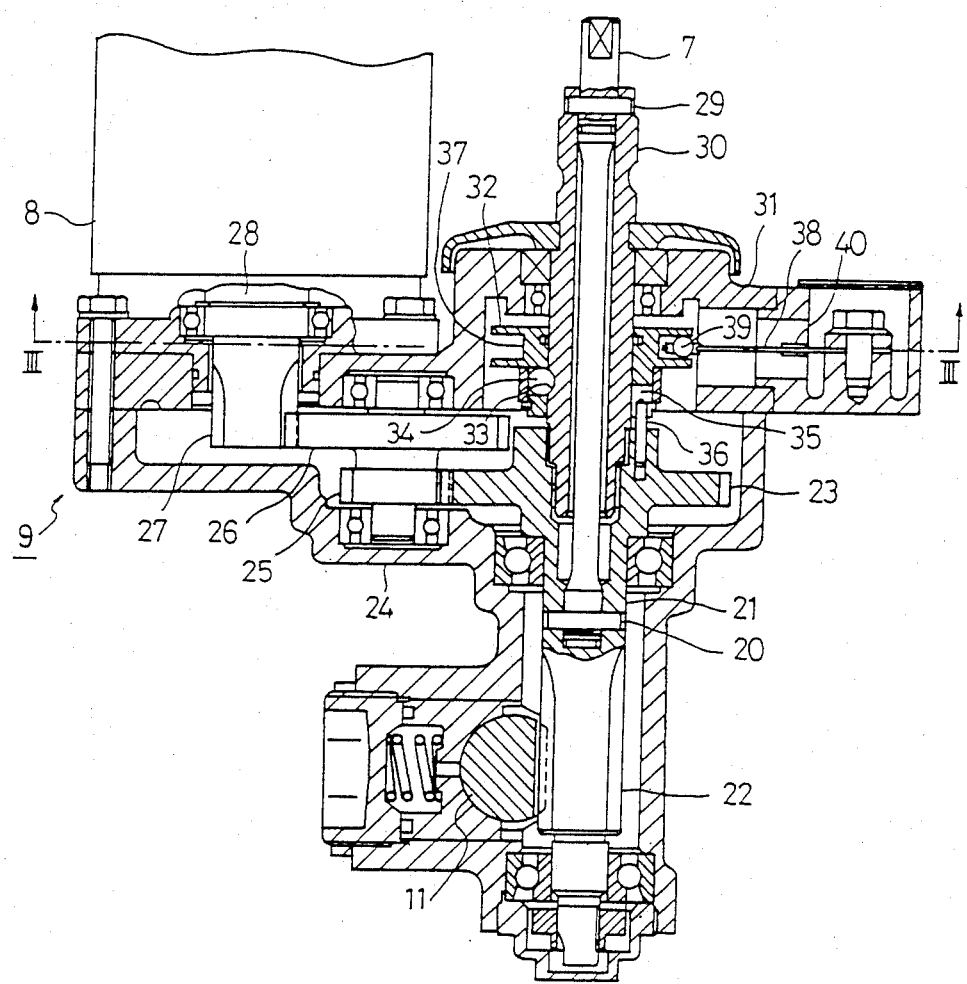
FIG. 2 is a cross section, taken along the line II—II shown in FIG. 3, to an enlarged scale, of a reduction gearing 9 shown in FIG. 1.
Figure 3:
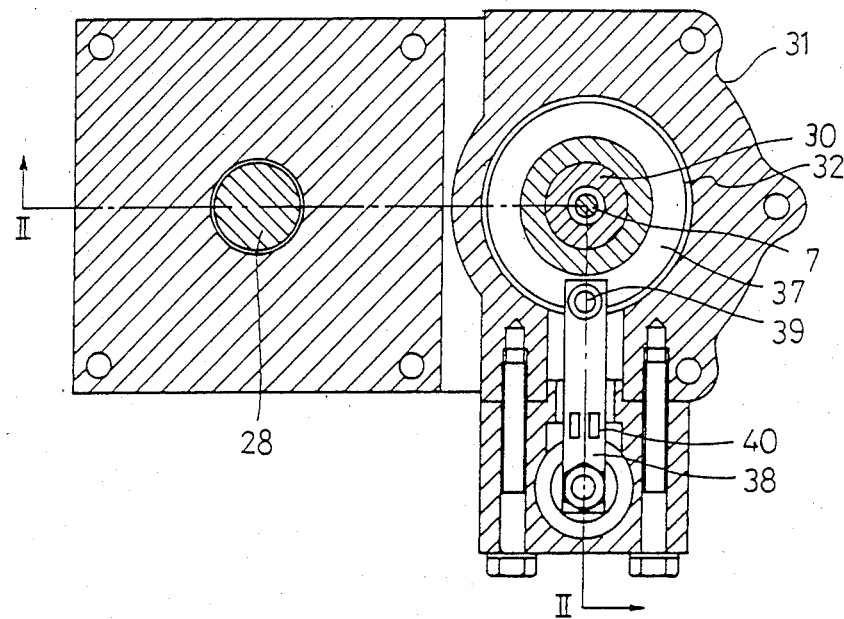
FIG. 3 is a cross section, taken along the line III—III shown in FIG. 2.

The internal construction of the reduction gearing 9 is shown in FIGS. 2 and 3. The upper end of the rod 7 is coupled to the second steering shaft 5 through the second universal joint 6 (see FIG. 1). A sleeve 30 is secured to the rod 7, slightly below the upper end thereof, by means of a pin 29. The sleeve 30 is rotatably mounted in an upper reduction gearing case 31 (see FIG. 2). The rod 7 extends through the sleeve 30 and into an output shaft 21, with its bottom end being secured to the output shaft 21 by means of a pin 20. The output shaft 21 is rotatably mounted in a lower reduction gearing case 24, and is formed with a pinion gear 22 on its lower end, which meshes with the rack 11. Accordingly, as the steering wheel 1 (see FIG. 1) rotates, the output shaft 21 is driven for rotation through a path including the first steering shaft 2, the first universal joint 4, the second steering shaft 5, the second universal joint 6 and the rod 7, whereby the rack 11 meshing with the pinion gear 22 on the output shaft 21 is driven in a direction perpendicular to the plane of the drawing of FIG. 2 or in a direction in which the tie rod 10 extends, as viewed in FIG. 1, thus changing the direction of the wheel 12 (see FIG. 1).

The output shaft 21 includes a hollow upper end around which a ring gear 23 is formed for meshing engagement with an intermediate gear 25 which is rotatably mounted within the case 24. Another intermediate gear 26 is coaxial and integral with the intermediate gear 25 and meshes with an input gear 27. The input gear 27 is fixedly mounted on an output rotating shaft 28 of an electric motor 8. When the motor 8 is energized, a gear train 27-26 and 25-23 is effective to cause the output shaft 21 to rotate, whereupon the rack 11 meshing with the pinion gear 22 on the output shaft 21 is driven in a direction perpendicular to the drawing of FIG. 2 or in a direction in which the tie rod 10 extends, as viewed in FIG. 1, thus changing the direction of the wheel 12 (see FIG. 1).

In this manner, the direction of the wheel 12 can be changed in response to either the rotation of the steering wheel 1 or the energization of the motor 8 for rotation in either forward or reverse direction.

Figure 4:
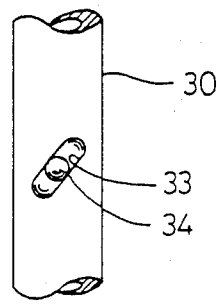
FIG. 4 is a top view of a sleeve 30 shown in FIGS. 2 and 3, illustrating its outside surface.

A wheel 32 is rotatably mounted on the sleeve 30 or the sleeve 30 extends through the wheel 32. As shown in FIG. 4, the external surface of the sleeve 30 is formed with a groove 33 having a rounded bottom and which extends at an angle with respect to the center axis of the sleeve 30, with a ball 34 being received in the groove 33 and held in place by the wheel 32. The wheel 32 is formed with a groove 35 of a reduced width, into which the upper end of a pin 36 which is fixedly mounted on the top end of the output shaft 21 extends. The pin 36 thus constrains the wheel 32 from rotating.

As the rod 7 rotates, the sleeve 30 and the output shaft 21 also rotate, but the rod 7 is twisted depending on a load upon the output shaft 21. This twist is manifest as a difference between the angle of rotation of the sleeve 30 which is fixedly mounted on the top end of the rod 7 and the angle of rotation of the wheel 32 to which the rotation of the output shaft 21 which is fixedly mounted on the lower end of the rod 7 is transmitted through the pin 36, causing an additional rotation of the sleeve 30 with respect to the wheel 32. This relative or differential rotation of the sleeve 30 with respect to the wheel 32 causes the groove 33, formed in the sleeve 30 at an angle with the axis thereof, to drive the ball 34 either upward or downward, thus driving the wheel 32 which carries the ball 34 up and down. The wheel 32 is formed with an annular groove 37 in which a ball 39 is engaged, as illustrated in FIG. 3. The ball 39 is rotatably carried by one end of a resilient blade 38, the other end of which is fixedly anchored. Thus, when the rod 7 is twisted depending on the load upon the output shaft 21 and the wheel 32 shifts either up or down, the resilient blade 38 will warp in one direction or the other. A pair of strain detecting elements which exhibit a resistance varying with the magnitude of the strain are cemented to the opposite surfaces of the resilient blade 38, and are connected in series to form a torque sensor 40. When the torque sensor 40 is excited with a suitable voltage, the junction between the pair of strain detecting elements assumes a potential which represents a warp of the resilient blade 38 in the upward or downward direction since one of them is subject to compressive stress while the other is subject to tensile stress to cause a corresponding change in the resistance. In this manner, when the rod 7 becomes twisted in response to a steering torque applied to the steering wheel 1, the wheel 32 shifts vertically in a corresponding manner to cause a warpage of the resilient blade 38, thus deriving an electrical signal which represents the steering torque from the torque sensor 40.

Figure 5:
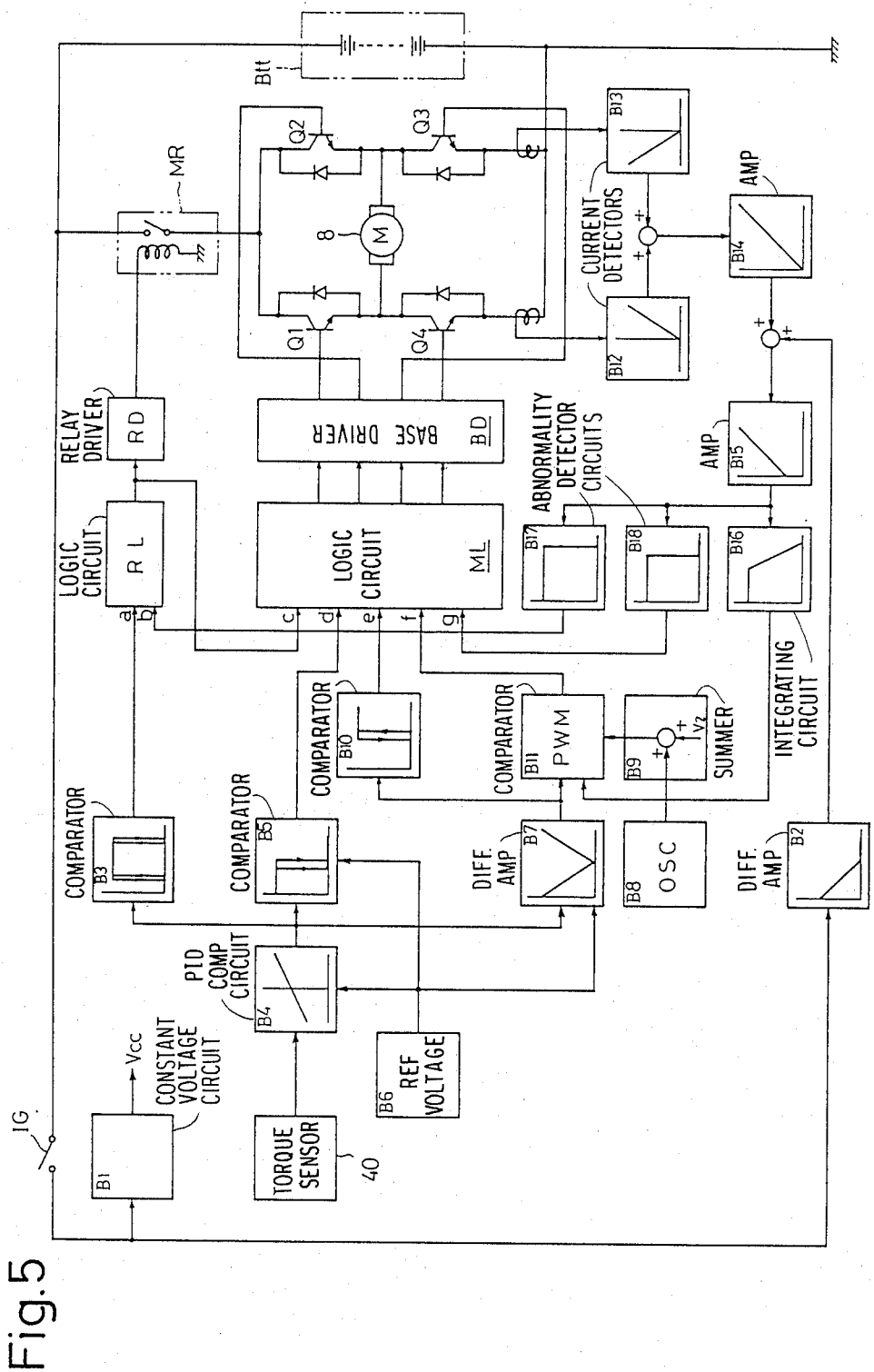
FIG. 5 is a block diagram of an electrical control system according to the first embodiment.
Figure 6A:
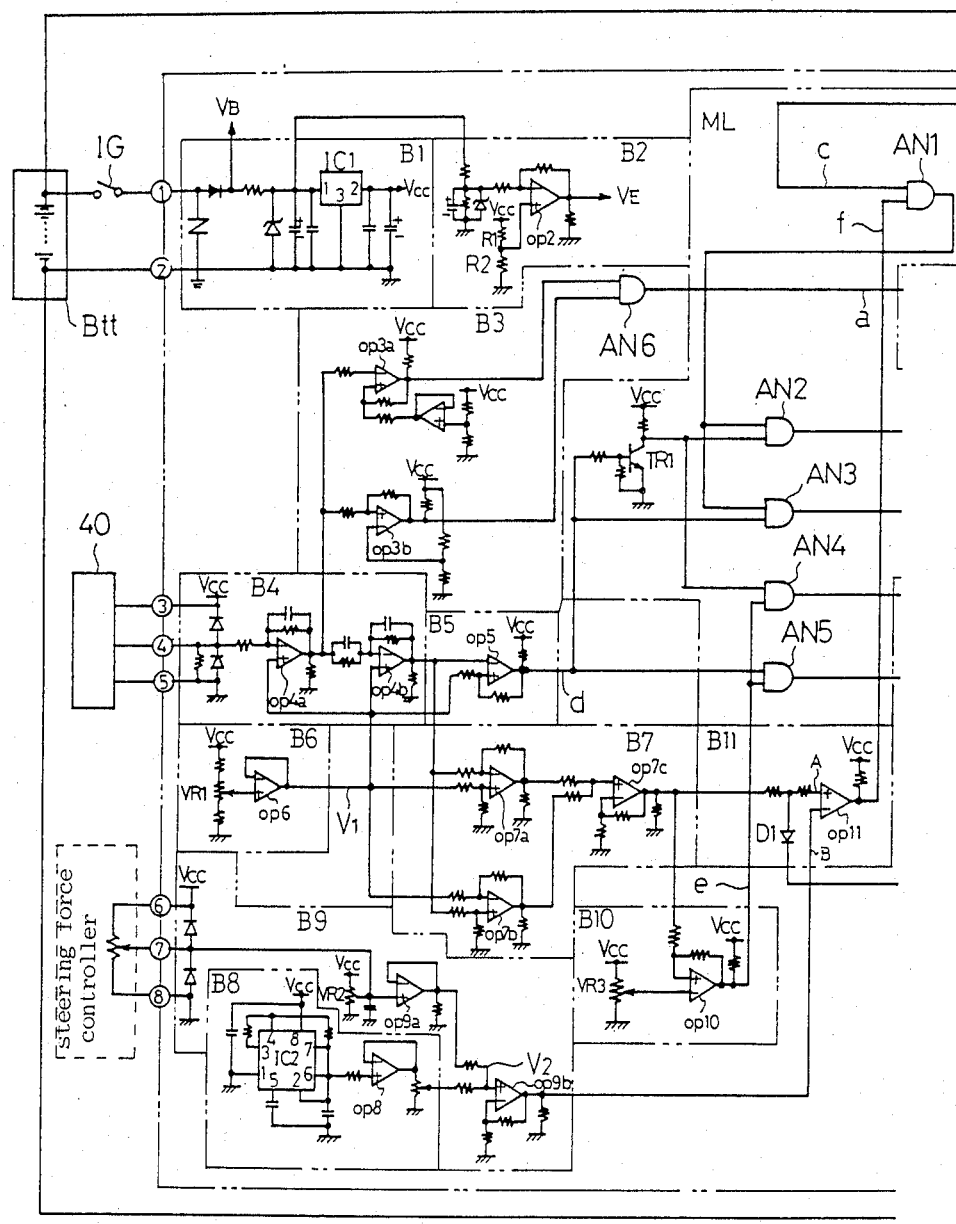
FIGS. 6a and 6b are detailed circuit diagrams of various blocks shown in FIG. 5.
Figure 6B:
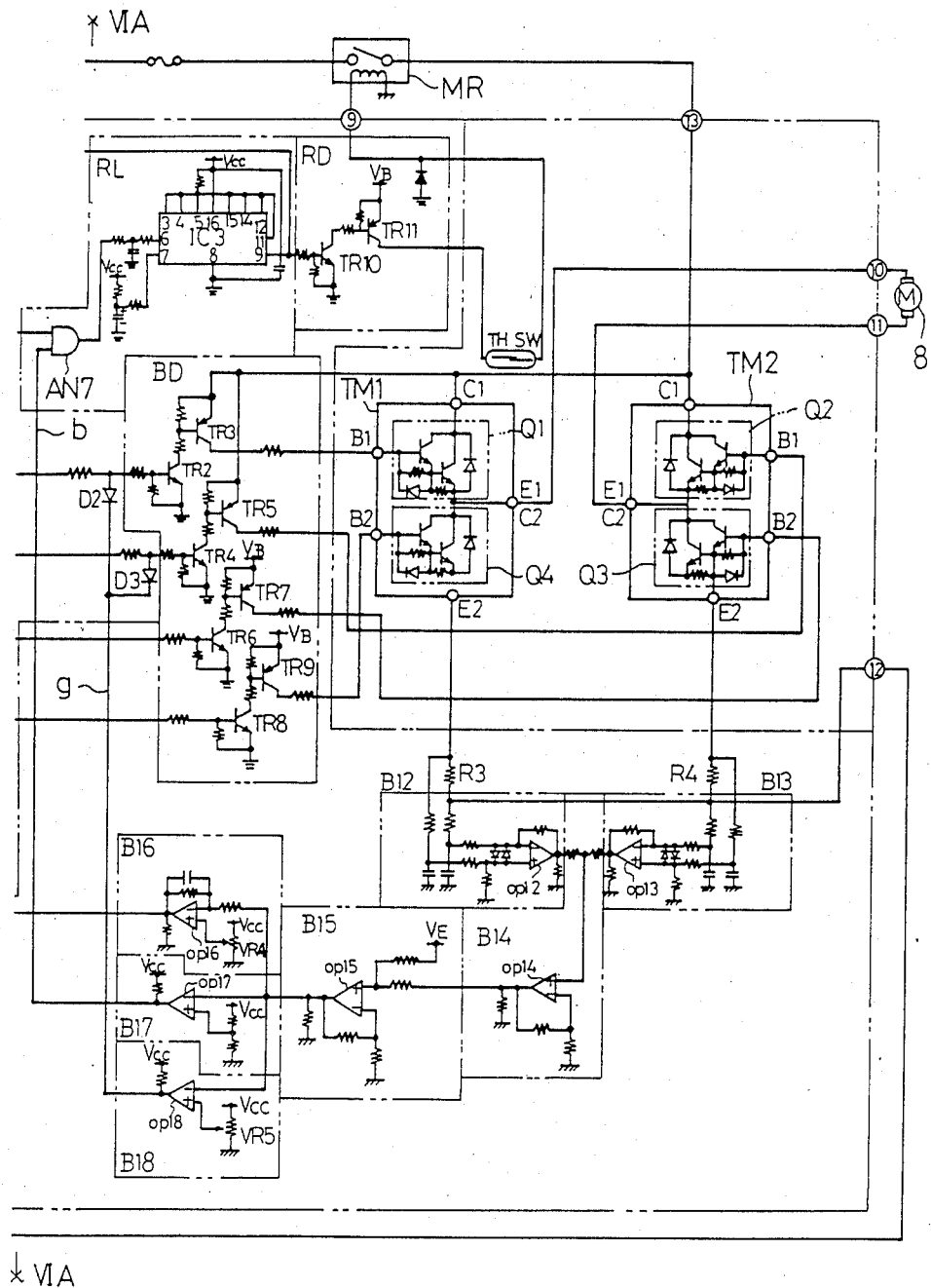
Figure 7:
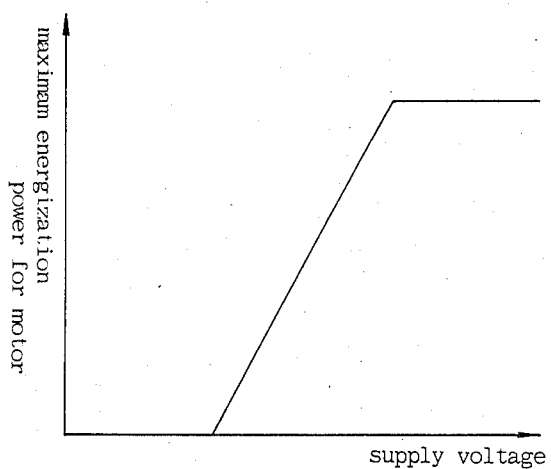
FIG. 7 graphically shows the maximum energization power level for the motor as a function of the voltage output from a power supply which is used in the first embodiment.

FIG. 5 is a block diagram of an electrical control system which controls the energization of the motor 8 in response to an output signal from the torque sensor 40, and FIGS. 6a and 6b show the details of individual blocks shown in FIG. 5. It is to be noted that each block shown in FIG. 5 has a graphical representation indicated therein which represents an electrical input-output response of the block. In each block, the abscissa represents an input level while the ordinate represents an output level. It is also to be noted that FIGS. 6a and 6b are joined together by coupling VIB—VIB line in FIG. 6a with VIA—VIA line in FIG. 6b to define a single composite drawing. The individual blocks will now be described with reference to FIGS. 5, 6a and 6b.

B1 block:

This represents a constant voltage circuit which essentially comprises an integrated circuit IC1, which comprises $\mu$PC14305H in the present embodiment. When an ignition switch IG is turned on, a voltage output from an onboard battery Btt is applied thereto, and the circuit feeds a constant voltage Vcc to various blocks.

B2 block:

This represents a differential amplifier circuit which essentially comprises an operational amplifier op2. When a voltage output from the battery is less than an output voltage from a voltage divider comprising resistors R1 and R2 and connected to the voltage Vcc, it delivers a positive voltage $V_E$ which corresponds to the difference therebetween. A smoothing circuit is connected to the input side of the amplifier op2 in order to prevent a malfunctioning which may result from a momentary fluctuation in the supply voltage.

B6 block:

This represents a circuit which establishes a first reference voltage $V_1$, which is chosen to be equal to a neutral potential from the torque sensor 40, that is, the potential which prevails when no torque is applied thereto, by adjusting a variable resistor VR1. The first reference voltage $V_1$ is fed to the B4, B5 and B7 blocks.

B4 block:

This represents a PID (proportional-plus-integral-plus-derivative) compensation circuit essentially comprising operational amplifiers op4a, op4b and operating to smooth out a fluctuation in an output signal or torque detecting signal from the torque sensor 40 caused by a mechanical lag of the steering system. The first reference voltage $V_1$ is applied from B6 block to this block, which linearly amplifies a difference between a d.c. input and the voltage $V_1$. In the description to follow, an output from this B4 block will be referred to as a torque detection signal.

B3 block:
This represents a window comparator comprising a pair of operational amplifiers op3a, op3b and AND gate AN6. It operates to detect a torque detection signal, or an output signal from an integrating circuit which essentially comprises the operational amplifier op4a in a prestage to B4 block, which goes beyond a preset range. When the torque detection signal reaches or exceeds the upper limit of the preset range, a comparator which essentially comprises operational amplifier op3a delivers a low level L (open collector output) while when the torque detection signal reaches the lower limit of the preset range or decreases beyond this value, the comparator which comprises operational amplifier op3b delivers a low level L (open collector output). A logical product of these outputs is formed by the gate AN6. The output from the gate AN6 is a sensor abnormality detection signal a which indicates an abnormality of the torque sensor 40 when it is at its low level L. It will be noted that a hysteresis response is introduced in each of the comparators in order to prevent chattering.

B5 block:
This represents a comparator essentially comprising an operational amplifier op5 and comparing the torque detection signal against the first reference voltage $V_1$ to deliver a rotation signal b which indicates the direction in which the steering wheel 1 has been turned. This circuit also exhibits a hysteresis response in order to prevent a chattering. Specifically, the rotation signal b will be at its low level L (open collector output) representing a right turning of the steering wheel 1 when the torque detection signal is close to or above the first reference voltage $V_1$, and will be at its high level H representing a left turning of the steering wheel 1 when the torque detection signal is close to or less than the first reference voltage $V_1$.

B7 block:
This block comprises a first differential amplifier essentially comprising an operational amplifier op7a, a second differential amplifier essentially comprising an operational amplifier op7b and a linear amplifier essentially comprising an operational amplifier op7c. The first differential amplifier amplifies a difference of the torque detection signal below the first reference voltage $V_1$, (corresponding to a left turning of the wheel 1), the second differential amplifier amplifies a difference of the torque detection signal over the first reference voltage $V_1$ (corresponding to a right turning of the wheel 1), and these outputs are added together to be linearly amplified by the linear amplifier. An output signal from the B7 block represents the absolute magnitude of the torque detection signal, or more strictly, the absolute magnitude of the difference with respect to the first reference voltage $V_1$ (hereafter referred to as "absolute torque signal"), and is applied to B10 and B11 blocks.

B8 block:
This represents a sawtooth wave generator essentially comprising an integrating circuit IC2, which is $\mu$PC1555 in the present embodiment.

B9 block:
This represents a summer which sums a second reference voltage $V_2$ with a sawtooth wave output from the B8 block, thus shifting the latter. The second reference voltage $V_2$ is controlled by a steering force controlling variable resistor VR2 which is located on a driver's seat.

B10 block:
This represents a comparator essentially comprising an operational amplifier op10 which presets a dead band. In this circuit, the absolute torque signal or an output from B7 block is compared against a voltage which is preset by a variable resistor VR3, and if the absolute torque signal is equal to or greater than the preset voltage, the circuit delivers a response signal e of a high level (open collect output) while the response signal e will be at its low level when the absolute torque signal is less than the preset voltage. The response signal e represents the presence or absence of a response when it is at a high level H and a low level L, respectively. A hysteresis response is also introduced into this circuit in order to prevent a chattering.

Figure 10:
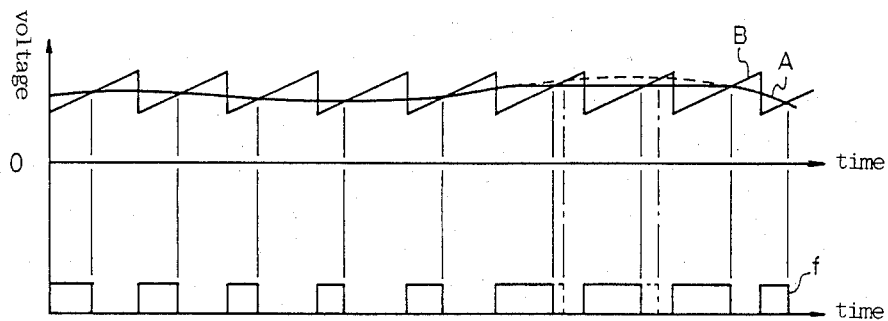

B11 block:
This represents a comparator essentially comprising an operational amplifier op11, and operates to compare the absolute torque signal A after it has been clamped by a clamp signal delivered from B16 block in a manner to be described later, against the sawtooth wave B delivered as an output from B8 block after it has been shifted. FIG. 10 shows one output mode where a PWM signal f assumes a high level H (open collector output) when the signal A is greater than the signal B, and assumes a low level L in the opposite instance.

B12 and B13 blocks:
These represent a current detector of an identical construction. Block B12 includes a differential amplifier essentially comprising an operational amplifier op12 which operates to amplify a voltage developed across a shunt resistor R3. Block B13 includes a differential amplifier comprising an operational amplifier op13 which amplifies a voltage across a shunt resistor R4. A current having a maximum value of about 30 amperes flows through the resistors R3 and R4, and accordingly, the input of each amplifier is provided with a protective circuit.

B14 block:
This represents a non-inverting amplifier essentially comprising an operational amplifier op14, and operating to sum outputs from B12 and B13 blocks to provide a current detection signal at its output.

B15 block:
This represents a non-inverting amplifier essentially comprising an operational amplifier op15, and operating to sum the current detection signal which is delivered by the B14 block with the output voltage $V_E$ from B2 block. Thus, when the voltage output from the power supply decreases, the magnitude of $V_E$ increases whereby the current detection signal shifts toward a higher value.

B16 block:
This represents an integrating circuit essentially comprising an operational amplifier op16 and operating to average the current detection signal after it has been shifted, thus delivering a clamp signal. When the current detection signal, as shifted, is higher than a voltage established by a variable resistor VR4, the clamp signal is reduced by an amount corresponding to the difference therebetween. In this manner, the lower the voltage output from the battery Btt, or the greater the energizing current of the motor 8, the lower the value which the clamp signal assumes. The clamp signal is applied to the cathode of a diode D1 (in block Bll) to clamp the absolute torque signal or the output from B7 block.

Figure 9:
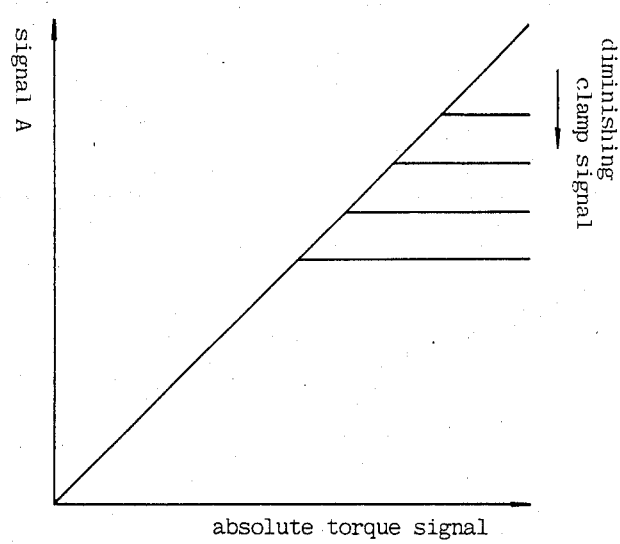
FIG. 9 graphically shows a relationship between a signal A from B11 block shown in FIG. 6a, an absolute torque signal and a clamp signal.

The relationship between the clamped signal A, the absolute torque signal and the clamp signal is graphically shown in FIG. 9. Referring to FIG. 9, when the clamp signal is sufficiently high, the signal A represents the absolute torque signal. On the other hand, as the clamp signal diminishes, the maximum value of the signal A also decreases. Accordingly, if the absolute torque signal is amplified in a manner as indicated by broken lines in FIG. 10, it is clamped by the clamp signal as indicated by a solid-line curve in FIG. 10, and accordingly the pulse width of PWM signal f cannot increase beyond that determined by the clamp signal. This means that the energization level of the motor 8 is limited as will be further described later.

B17 block:

This represents an abnormality detector circuit essentially comprising an operational amplifier op17 and operating to detect any abnormality of the energizing current of the motor 8. It in effect forms a comparator which compares the current detection signal as shifted against a preset value. If the current detection signal as shifted is equal to or less than the preset value, a current abnormality detection signal b assumes a high level H (open collector output) which indicates the absence of an abnormality. On the other hand, when the current detection signal as shifted exceeds the preset value, the current abnormality detection signal b changes to its low level, indicating the presence of an abnormality. The signal b is applied to a relay logic RL.

B18 block:

This represents an abnormalty detector circuit essentially comprising an operational amplifier op18 and operating to detect an abnormality of the energizing current of the motor 8. It in effect operates as a comparator which compares the current detection signal as shifted against a preset value. If the current detection signal as shifted is equal to or less than a given voltage which is preset by a variable resistor VR5, PWM blocking signal g assumes a high level H (open collector output) indicating non-occurrence of a blocking operation. However, when the current detection signal as shifted exceeds the preset voltage, the signal g changes to its low level, indicating the occurrence of a blocking operation. The signal g is applied to a main logic ML.

In contrast to the current abnormality detection signal b delivered by block B17 which principally operates to deenergize the main relay MR in the presence of an abnormality to cease feeding the motor 8, PWM blocking signal g delivered by B18 block negatively clamps PWM signal or more strictly, outputs from AND gates AN2 and AN3 in ML block to block the energization of the motor 8. When it is detected in B18 block that the energizing current of the motor 8 is excessively high, PWM blocking signal g is changed to its low level, thus blocking the energization of the motor 8. This reduces the energizing current of the motor 8 (even though the current cannot be instantly reduced to zero because of transient change), and accordingly the signal g will then be changed to its high level H. At the next moment, the excessively high level of the energizing current is detected again, whereby the signal g is changed to its low level L. In this manner, in B18 block, PWM blocking signal g is repeatedly changed between its low level L and high level H as long as an excessive energizing current of the motor 8 is detected, thus chopping PWM signal to reduce the mean energizing current of the motor 8.

Because the preset voltage of block B16 is less than the preset voltage of block B18 which is in turn less than the preset voltage of block B17, when the voltage output from the battery Btt is low and the energizing current of the motor 8 increases, the pulse width of PWM signal f is initially limited, followed by chopping PWM signal, or strictly, outputs from the gates AN2 and AN2 of the block ML, and if no improvement is achieved (meaning that the supply voltage remains low and/or the energizing current is still at a high level), the power supply to the motor 8 will be interrupted by the main relay MR.

RL block:

This represents a logic circuit including AND gate AN7 and a latch circuit IC3. The relationship between two inputs, namely, sensor abnormality detection signal a and the current abnormality detection signal b, and an output signal c is indicated in Table 1 below where "H" and "L" stand for a high and a low level, respectively.

TABLE 1

| a | b | c |
|---|---|---|
| L | L | L |
| L | H | L |
| H | L | L |
| H | H | H |

Initially when the ignition switch IG is turned on, the latch circuit IC3 is reset, whereby the output signal c assumes a high level H, and subsequently remains at H level as long as the both signal a and b are at their high level H, indicating the absence of any abnormality. However, as soon as one of these signals assumes a low level L, indicating the occurrence of abnormality, the output signal c changes to its low level L, which is latched by the latch circuit IC3 and remains unchaged unless the ignition switch IG is turned on again. The output signal c is applied to a relay driver RD and the main logic ML.

RD block:

This represents a relay driver comprising a pair of transistors TR10 and TR11. When a base input to the transistor TR10 or the output signal c from the RL block assumes a high level H, the main relay MR connected in a supply line to the motor 8 or a line which interconnects the emitters of power transistors Q1 and Q2 with the battery Btt is energized. A switch THSW is connected in the feed line to the main relay MR, and is formed by a thermal switch mounted on a heat dissipating board for power transistors Q1, Q2, Q3 and Q4 for preventing an excessive heating. Specifically, whenever at least one of the transistors Q1 to Q4 is overheated and the temperature of the heat dissipating board exceeds a given value, the thermal switch is opened to interrupt the feed line to the main relay MR.

ML block:

This represents a logic circuit essentially comprising AND gates AN1, AN2, AN3, AN4 and AN5. The output signal c from the RL block and PWM signal f from B11 block are fed to the gate AN1. Thus, the gate AN1 blocks PWM signal in the presence of either the sensor abnormality detection signal a or the current abnormality detection signal b. The output of the gate AN1 is applied to one input of the gates AN2 and AN3. The other input of the gate AN2 receives the rotation signal d which is inverted by the transistor TR1. Thus the gate AN2 passes the PWM signal from the gate AN1 when the rotation signal d assumes a low level L, indicating a clockwise rotation. The output from the gate AN2 is applied to a base driver BD. However, PWM blocking signal g is applied to the cathode of a diode D2, and hence when the signal g assumes a low level L, this output is clamped to a negative value and is prevented from being delivered. The other input of the gate AN3 receives the rotation signal d. Accordingly, it delivers the PWM signal when the rotation signal d assumes a high level H, indicating a counterclockwise rotation. The output from the gate AN3 is applied to the base driver BD, but the PWM blocking signal g is applied to the cathode of a diode D3, and hence when the signal g assumes a low level L, the output is clamped to a negative value and is prevented from being delivered.

One input of the gate AN4 receives the rotation signal d which is inverted by the transistor TR1 while the other input of the gate receives the response signal e which is delivered by B10 block. Accordingly, the gate AN4 delivers a high level H when the rotation signal d assumes a low level L, indicating a clockwise rotation, and the response signal e assumes a high level. One input of the gate AN5 receives the rotation signal d while the other input receives the response signal e from B10 block. Accordingly, the gate AN5 delivers a high level H when the rotation signal d assumes a high level, indicating a counter-clockwise rotation, and the response signal e assumes a high level H.

BD block:

The base driver BD comprises a base driving circuit associated with the power transistor Q1 and including transistors TR2 and TR3; a base driving circuit associated with power transistor Q2 and including transistors TR4 and TR5; a base driving circuit associated with power transistor Q3 and including transistors TR6 and TR7; and a base driving circuit associated with power transistor Q4 and including transistors TR8 and TR9. Except for the level, this circuit may be simply considered as a "pass-through" circuit since there is no change between the input and the output.

TM1 and TM2 blocks:

These blocks include power transistors Q1, Q2, Q3 and Q4 which operate to energize the motor 8 for rotation in either forward or reverse direction. Considering each transistor circuit as represented by a single transistor in the manner illustrated in FIG. 5, the collectors of the transistors Q1 and Q2 are connected through the contacts of the main relay MR to the positive terminal of the onboard battery Btt while the emitters of the transistors Q3 and Q4 are connected through the shunt resistor R4 or R3 to the negative terminal of the onboard battery Btt. During a normal operation when the sensor abnormality detection signal a and the current abnormality detection signal b indicate no occurrence of an abnormality and PWM blocking signal has no blocking action, the turn-on and -off of the power transistor Q1 is controlled by PWM signal when the rotation signal d assumes a low level L, indicating a clockwise rotation. Similarly, the turn-on and -off of the power transistor Q2 is controlled by PWM signal when the rotation signal d assumes a high level H, indicating a counter-clockwise rotation. The turn-on and -off of the power transistor Q3 is controlled by the output from the gate AN4, the transistor being turned on when the rotation signal d assumes a low level L and the response signal e assumes a high level. The turn-on and -off of the power transistor Q4 is controlled by the output from the gate AN5, the transistor being turned on when the rotation signal d assumes a high level H and the response signal e assumes a high level H. It will be seen that the motor M is energized for rotation in the forward direction when the power transistors Q1 and Q3 are on and energized for rotation in the reverse direction when the power transistors Q2 and Q4 are on.

Table 2 indicated below summarizes the signals applied to the bases of the power transistors Q1, Q2, Q3 and Q4 in response to the input signals c, d, e, f and g from the main logic ML. In Table 2, "*" represents "don't care", meaning either high level H or low level L may do; "-" represents "don't determine"; " ⊓⌐ " indicates a PWM control; and "H" or "L" appearing in the columns of the input signals c, d, e, f and g represents a high level H or low level L input (IC level); and "H" or "L" in the columns of the signals applied to the bases of the power transistors Q1, Q2, Q3 and Q4 indicates a high level H (on level) or a low level L (cutoff level) input, respectively.

TABLE 2

| input signals | | | | | base signals | | | |
|---|---|---|---|---|---|---|---|---|
| c | d | e | f | g | Q1 | Q2 | Q3 | Q4 |
| L | * | * | * | * | L | L | — | — |
| * | * | * | * | L | L | L | — | — |
| H | L | L | ⊓⌐ | H | ⊓⌐ | L | L | L |
| H | L | H | ⊓⌐ | H | ⊓⌐ | L | H | L |
| H | H | L | ⊓⌐ | H | L | ⊓⌐ | L | L |
| H | H | H | ⊓⌐ | H | L | ⊓⌐ | L | H |

A series of operations occurring in the electrically driven power steering apparatus of the present embodiment which take place under the control of the electrical control system mentioned above and shown in FIGS. 5, 6a and 6b will now be described.

(1) When the ignition switch IG is turned on, given voltages are supplied to various blocks, and the system is in a standby condition.

(2) When a driver of the vehicle turns the steering wheel 1 clockwise, the steering system is mechanically driven in the manner mentioned previously to change the attitude of the wheel 12 so as to cause a right turn thereof. The steering force is detected by the torque sensor 40, which delivers a torque detection signal which assumes a higher potential than a neutral potential. Conversely, when the driver turns the steering wheel 1 counter-clockwise, the steering system is mechanically driven to change the attitude of the wheel 12 so as to achieve a left turn, and a steering force is again detected by the torque sensor 40, which delivers the torque detection signal having a lower potential than the neutral potential.

(3) As illustrated in FIG. 10, the magnitude of the torque detection signal or the absolute torque signal A as clamped is compared against the sawtooth wave B as shifted, and when the signal A is greater, a high level H is delivered as an output. Accordingly, the pulse width of PWM signal f is proportional to the magnitude of the steering force which has been applied. It will be noted that the level of the torque detection signal with respect to the neutral potential is defined by the rotation signal d having a low level L for a clockwise rotation and a high level H for a counter-clockwise rotation of the steering wheel 1. Accordingly, when the driver turns the steering wheel 1 clockwise, the motor M is energized at a energization power level (mean value) corresponding to the steering force applied for rotation in the forward direction. When the driver turns the steering wheel 1 counter-clockwise, the motor 8 is energized at a proper power level for rotation in the reverse direction. When energized, an assisting steering force from the motor 8 is applied to the steering system, and the total steering force converges to a given value, which can be adjusted by using a corresponding control element. The steering force which is required of the driver is thus reduced.

Figure 8:
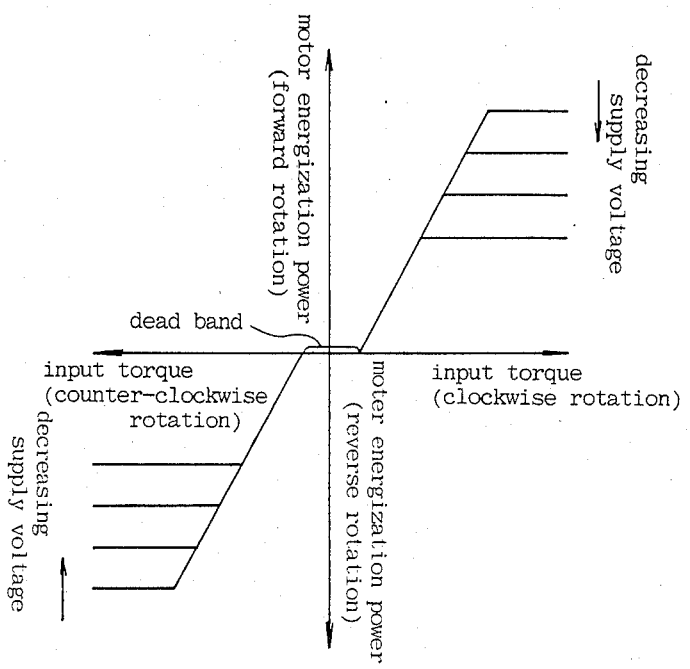
FIG. 8 graphically shows the relationship between the energization power level of the motor, detected steering force and the voltage output from the power supply as used in the first embodiment.

(4) When the voltage output from the battery Btt decreases, the current detection signal which is obtained by detecting the mean energizing current of the motor 8 shifts to a higher value, whereby a clamp signal of a smaller value is established. The clamp signal clamps the absolute torque signal, and accordingly, when the clamp signal decreases, the maximum value of the signal A is limited in a manner illustrated in FIG. 9. When the maximum value of the signal A is limited, the maximum value of the pulse width of PWM signal f is also limited, as illustrated in FIG. 10. As a result, as the voltage output from the battery decreases, the energizing power level of the motor will be saturated at a smaller value of the input torque or steering force, generally in a manner illustrated in FIG. 8.

This limits the magnitude of the assisting steering force, and a magnitude of steering force greater than the converging value will be required from the driver, who would feel it heavy to operate the steering wheel 1, but it will be seen from the foregoing description that this does not cause a rapid change in the steering force which is required of the driver. It will be appreciated that the steering force which is applied by the driver is originally small during a normal running, requiring an assisting steering force of a reduced magnitude, and hence such change does not militate against the drivability during the running of the vehicle. In other words, a steering operation which takes place when the vehicle is at rest or when the vehicle is running at a very slow speed will become heavier. When the current detection signal as shifted increases further, the PWM blocking signal g is developed to clamp PWM signal h or outputs from the gates AN2 and AN3 to a negative value. This reduces the magnitude of the current detection signal, whereby the PWM blocking signal g is removed. The described operation is then repeated. In this manner, the PWM signal h is chopped with a reduced period, thus reducing the mean value of the energizing power of the motor 8.

In the event an abnormality occurs within the motor 8, the current detection signal as shifted will increase further, and in this instance, the main relay MR interrupts the supply line to the motor 8. In the event an abnormality of the torque sensor 40 is detected or when the power transistors Q1 to Q4 experience an overheating, the main relay MR again interrupts the supply line to the motor 8. When the main relay MR is deenergized in this manner, it is not energized again unless the ignition key IG is turned on again.

Figure 11:
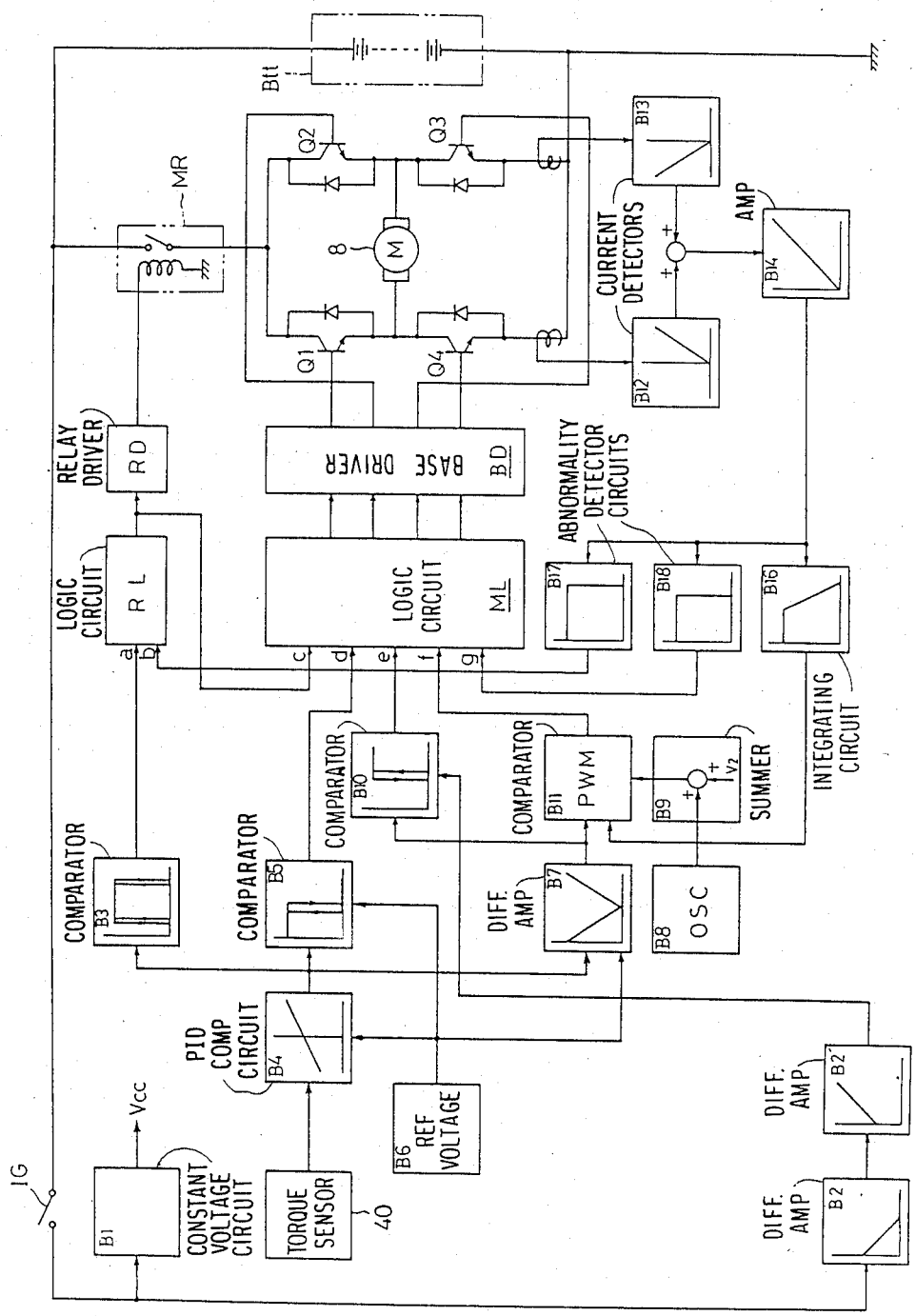
FIG. 11 is a block diagram of an electrical control system according to the second embodiment.

Referring to FIG. 11, a second embodiment of the invention will now be described. It is to be noted that the mechanical construction for the second embodiment remains the same as for the first mentioned embodiment, and the electrical arrangement is only partly modified, and hence only differences will be pointed out.

Figure 12:
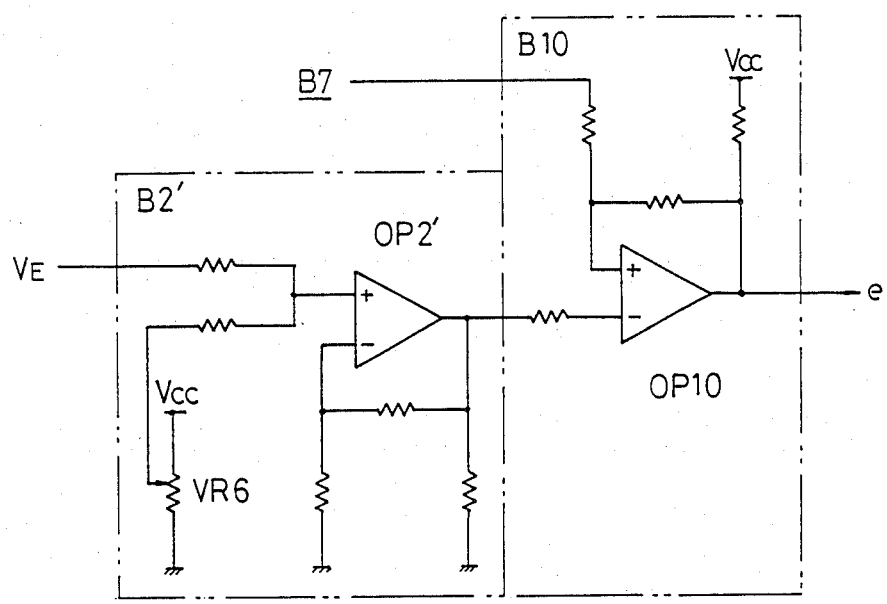
FIG. 12 is a circuit diagram showing the detail of B2' and B10 blocks shown in FIG. 11.

In the second embodiment, a positive bias is added to the output voltage $V_E$ from B2 block within a next following B2' block for linear amplification, thus deriving a dead band voltage which is applied to B10 block. The detail of B2' and B10 blocks used in the second embodiment is shown in FIG. 12.

Figure 13:
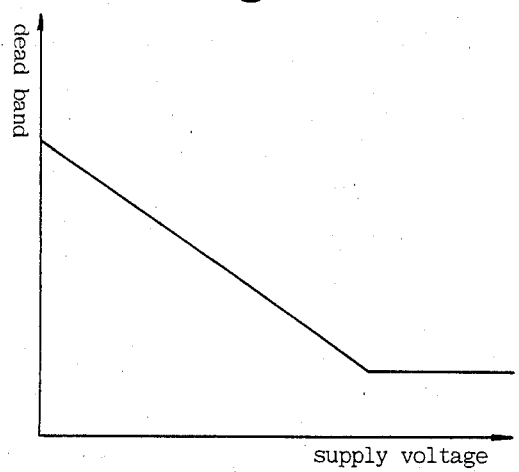
FIG. 13 graphically shows the width of the dead band as a function of the voltage output from the power supply as used in the second embodiment.

Specifically, in the B2' block, a voltage which is established by means of a variable resistor VR6 is summed with the output voltage $V_E$ from B2 block to derive a dead band voltage. B10 block is formed as a comparator essentially comprising an operating amplifier op10, which compares the absolute torque signal or the output from B7 block against the dead band voltage. Specifically, when the voltage output from the battery decreases, the output voltage $V_E$ from B2 block increases, and accordingly, the dead band voltage is preset to a higher value, thus increasing the width of the dead band as graphically shown in FIG. 13. Accordingly, as graphically illustrated in FIG. 14, the motor 8 does not begin to be energized unless a steering force of a magnitude which is greater than usual is applied when the supply voltage decreases. It is also to be noted that the motor 8 is energized at a power level which is less in magnitude than for a normal battery voltage for the same magnitude of steering force applied by the driver. It is to be noted that in the second embodiment, there is no summing of the output voltage $V_E$ from B2 block to the output voltage from B14 block which represents the energizing current of the motor 8, and accordingly B15 block is eliminated. In other respects, the electrical arrangement is quite similar to that of the first embodiment.

A series operations which take place in the electrically driven power steering apparatus of the second embodiment will now be described.

(1) When the ignition switch IG is turned on, given voltages are supplied to various blocks, whereby the system is in a standby condition.

(2) When the driver of a vehicle turns the steering wheel 1 clockwise, the steering system is mechanically driven in the manner mentioned above to change the attitude of the wheel 12 so that the vehicle runs to the right. The magnitude of the steering force is detected by the torque sensor 40, which derives the torque detection signal of a potential higher than the neutral potential. When the driver turns the steering wheel 1 counter-clockwise, a similar operation takes place, and the torque sensor 40 derives the torque detection signal of a potential lower than the neutral potential.

Figure 14:
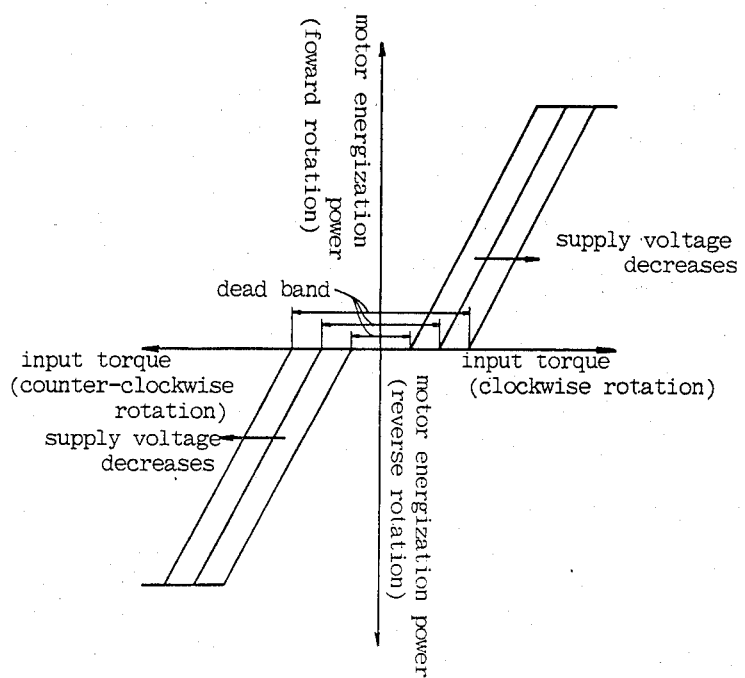
FIG. 14 graphically illustrates a relationship between the energization power level for the motor, the steering force detected and the voltage output from the power supply as used in the second embodiment.

(3) When the torque detection signal goes beyond the dead band as viewed in FIG. 14, the magnitude of the torque detection signal or the absolute torque signal A is compared against the sawtooth wave (as shifted) B in the manner illustrated in FIG. 10, and when the signal A is greater, a high level H is derived to develop PWM signal f of a pulse width which is proportional to the magnitude of the steering force applied. The relative potential of the torque detection signal with respect to the neutral potential is defined by the rotation signal d which indicates the direction of the turning of the steering wheel 1 (a low level L standing for a clockwise turn and a high level H for a counter-clockwise turn), whereby when the driver turns the steering wheel 1 clockwise, the motor 8 is energized for rotation in the forward direction at an energizing power (mean value) which corresponds to the steering force applied. When the driver turns the steering wheel 1 counter-clockwise, the motor 8 is energized again at a corresponding power level, but for rotation in the reverse direction. The assisting steering force developed as the motor 8 is energized is effective to reduce the steering force which is required of the driver, and the steering force converges toward a given value, which can be adjusted by means of a variable resistor.

(4) When the voltage output from the battery Btt decreases, the width of the dead band increases. Thus as generally illustrated in FIG. 14, the motor 8 does not begin to be energized unless a steering force of a greater magnitude than usual is applied or if the absolute torque signal of a greater magnitude is not detected, and the mean value of energization power level of the motor is limited to a smaller value. In other words, the point at which the assisting steering force begins to be applied shifts to a higher level of the absolute torque signal, and hence the motor 8 will be energized at a lower power level than usual for the same magnitude of the steering force applied by the driver. This requires a steering force of a greater magnitude from the driver which would be higher than the converging value, and the driver will feel the operation of the steering wheel 1 heavier. As described above, this does not cause a rapid change in the steering force which is required of the driver, and the steering force applied by the driver during a normal running is originally small, thus requiring an assisting steering force of a reduced magnitude from the system, and hence such change does not militate against the drivability during the time the vehicle is running. Only the steering operation which takes place when the vehicle is at rest or is running at a very slow speed will become heavier.

(5) When the current detection signal which senses the energizing current of the motor increases, the absolute torque signal is clamped to a smaller value than usual. Because the energizing current of the motor is proportional to the motor load, the maximum value of the energizing current is limited to prevent an overloading of the motor 8. If the energizing current of the motor further increases, PWM blocking signal g is developed to clamp PWM signal h to a negative value. This reduces the current detection signal, whereby PWM blocking signal g will be removed. This operation is repeated, thus chopping PWM signal h with a short period to reduce the mean energizing power level of the motor 8.

If the current detection signal still increases to a higher value, the main relay MR is deenergized to interrupt the supply line to the motor 8. In the event an abnormality of the torque sensor 10 is detected or upon occurrence of an overheating of the power transistors Q1 to Q4, the thermal switch THSW causes the main relay MR to be deenergized, again interrupting the supply line to the motor 8. After the main relay MR is deenergized in this manner, the relay cannot be energized again unless the ignition key IG is turned on again.

It is contemplated to provide an electrically driven power steering apparatus having the combined function of the first and the second embodiment, but such arrangement will not be specifically described since this would repeat what has been mentioned previously.

In the first and the second embodiment mentioned above, the electric power is generated by a generator which is driven by the rotation of an engine, and which charges the onboard battery Btt. However, such generator is omitted from illustration. However, it should be understood that the supply voltage also includes the charged voltage. Accordingly, when the vehicle running at high speeds, a sufficient charging operation takes place to maintain a sufficient high supply voltage to enable an assisting steering force of a stabilized magnitude to be applied to the steering system. When the vehicle is running at lower speeds, the generator may not be able to sufficiently charge the battery, and hence there may result a reduction in the supply voltage which is attributable to a reduction in the voltage of the onboard battery Btt including a degradation thereof. In such instance, a steering force which is required of the driver will change. Such change occurs gently, and does not militate against the drivability. Since it occurs when the vehicle is running at low speeds, it does not influence upon the safety factor.

As described, in accordance with the invention, the voltage output from an onboard supply is monitored, and when the voltage is less than a given value, the motor is energized at a lower power level than usual for developing an assisting steering force which is applied to a steering system. In this manner, a degradation in the onboard battery which would result when the electrically driven power steering apparatus is operated under a reduced supply voltage can be prevented. In the first embodiment, the energizing power level of the motor is limited by establishing an upper limit upon the energizing power level, thus inhibiting an energization of the motor at a level exceeding the upper limit. In the second embodiment, a lower limit is established for a driving force which is applied from the steering wheel, and an energization of the motor is inhibited for a driving force which is less than the lower limit.

Having described the invention, what is claimed is:

1. An electrically driven power steering apparatus comprising:

a running direction controlling mechanism which determines the direction of a wheel with respect to a car body;

steering means coupled to the controlling mechanism for driving the controlling mechanism;

driving force detector means for detecting a driving force which is applied to the direction control mechanism by the steering means;

an electric drive mechanism including an electric motor which is coupled to the direction controlling mechanism;

means for energizing the electric motor of the electric drive mechanism;

voltage detector means for detecting a voltage output from an onboard power supply;

energization control means responsive to the driving force detected by the driving force detector means for controlling the energization of the motor at a higher power level in response to the detected driving force of an increased magnitude and at a lower power level in response to the detected driving force of a reduced magnitude and responsive to the voltage detector means for controlling the energization of the motor at a power level which is less than the power level corresponding to the detected driving force whenever the voltage detected by the voltage detector means is below a given value;

and energization command means for commanding said energizing means to energize the electric motor of the electric drive mechanism in accordance with the response of the energization control means.

2. An electrically driven power steering apparatus according to claim 1 in which the energization control means includes maximum energization power level presetting means which is operative to establish a reduced maximum energization power level corresponding to the detected voltage whenever the voltage detected by the voltage detector means is below the given value.

3. An electrically driven power steering apparatus according to claim 2 in which the energization control means allows the motor to be energized at the energization power level which corresponds to the driving force detected by the driving force detector means when such energization power level is equal to or less than the maximum energization power level established by the maximum energization power level presetting means, and allows the motor to be energized at a reduced maximum energization power level if the energization power level which corresponds to the detected driving force exceeds the maximum energization power level.

4. An electrically driven power steering apparatus according to claim 1 in which the energization control means includes a minimum response driving force presetting means which is operative to establish an increased minimum response driving force corresponding to the voltage detected by the voltage detector means when such detected voltage is equal to or below a given level.

5. An electrically driven power steering apparatus according to claim 4 in which the energization control means allows the motor to be energized at an energization power level corresponding to the detected driving force when the driving force detected by the driving force detector means exceeds the minimum response driving force established by the minimum response driving force presetting means.

* * * * *